US010809966B2

(12) United States Patent
Shi et al.

(10) Patent No.: US 10,809,966 B2
(45) Date of Patent: Oct. 20, 2020

(54) SYSTEM AND METHOD OF AUDIO INFORMATION DISPLAY ON VIDEO PLAYBACK TIMELINE

(71) Applicant: Honeywell International Inc., Morristown, NJ (US)

(72) Inventors: Chun Jian Shi, Shanghai (CN); Bin Ye, Shanghai (CN); Bei Nian, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 760 days.

(21) Appl. No.: 13/827,001

(22) Filed: Mar. 14, 2013

(65) Prior Publication Data

US 2014/0281974 A1 Sep. 18, 2014

(51) Int. Cl.
*G06F 3/16* (2006.01)
*G11B 20/10* (2006.01)
(Continued)

(52) U.S. Cl.
CPC ........ *G06F 3/165* (2013.01); *G11B 20/10527* (2013.01); *G11B 27/28* (2013.01); *G11B 27/34* (2013.01)

(58) Field of Classification Search
CPC . G06F 3/16; G06F 17/30; G06F 3/165; G09B 15/02; G11B 20/10; G11B 27/34;
(Continued)

(56) References Cited

U.S. PATENT DOCUMENTS 6,292,184 B1 * 9/2001 Morgan .............. G06F 3/04847
345/600
6,747,828 B2 * 6/2004 Lee ................................ 360/53
(Continued)

FOREIGN PATENT DOCUMENTS

CN 101064177 A 10/2007
CN 102508596 A 6/2012
(Continued)

OTHER PUBLICATIONS

G. Tzanetakis. Manipulation, Analysis and Retrieval Systems for Audio Signals, Princeton University, A Dissertation Presented to the Faculty, Jun. 2002.*
(Continued)

*Primary Examiner* — Sang H Kim
(74) *Attorney, Agent, or Firm* — Seager Tufte & Wickhem LLP

(57) ABSTRACT

Systems and methods of displaying a visual representation of audio information on a timeline associated with a data stream file are provided. Some methods can include receiving audio information, determining at least one property of the audio information, and determining a visual representation for the audio information, wherein the visual representation for the audio information corresponds to the property of the audio information. Some methods can include displaying a timeline associated with a data stream file, and displaying a visual representation of audio information in the data stream file on respective segments of the timeline, wherein the visual representation corresponds to at least one property of the audio information.

7 Claims, 3 Drawing Sheets

(51) Int. Cl.
*G11B 27/28* (2006.01)
*G11B 27/34* (2006.01)

(58) Field of Classification Search
CPC ........ G11B 2020/10574; G11B 27/038; G11B 27/031; B60K 35/00; H04R 29/008
USPC .............................. 715/704, 716; 3/704, 716
See application file for complete search history.

(56) References Cited

U.S. PATENT DOCUMENTS

| | | | | |
|---|---|---|---|---|
| 7,266,771 | B1* | 9/2007 | Tow .................. | G06F 17/30787 345/699 |
| 7,552,120 | B2* | 6/2009 | Essafi ................. | G06F 17/3002 |
| 7,640,552 | B2* | 12/2009 | Miller et al. .................. | 719/320 |
| 8,208,788 | B2* | 6/2012 | Ando et al. .................... | 386/240 |
| 8,938,404 | B2* | 1/2015 | Capman et al. ................. | 706/12 |
| 2003/0038798 | A1* | 2/2003 | Besl ........................ | G06T 15/00 345/420 |
| 2007/0071413 | A1* | 3/2007 | Takahashi et al. ............. | 386/96 |
| 2009/0188376 | A1* | 7/2009 | Nease ..................... | A63J 17/00 84/485 R |
| 2010/0302445 | A1* | 12/2010 | Kunihara .............. | G06F 1/1601 348/569 |
| 2011/0010623 | A1* | 1/2011 | Vanslette et al. ............. | 715/704 |
| 2012/0054611 | A1* | 3/2012 | Perrodin ................ | G11B 27/34 715/716 |
| 2012/0216666 | A1* | 8/2012 | Fresolone ............ | G09B 21/009 84/483.2 |
| 2013/0156204 | A1* | 6/2013 | Schulz .................. | H04M 3/569 381/56 |
| 2014/0035920 | A1* | 2/2014 | Duwenhorst ......... | G06T 11/001 345/440 |
| 2014/0281970 | A1* | 9/2014 | Schnepel et al. ............. | 715/716 |
| 2015/0035665 | A1* | 2/2015 | Plante .................... | G07C 5/008 340/438 |
| 2016/0142830 | A1* | 5/2016 | Hu ........................ | G02C 11/06 434/185 |

FOREIGN PATENT DOCUMENTS

| | | |
|---|---|---|
| EP | 0 322 100 A2 | 6/1989 |
| EP | 0322 100 A3 | 6/1989 |
| WO | WO 91/03053 A1 | 3/1991 |
| WO | WO 94/16443 A1 | 7/1994 |

OTHER PUBLICATIONS

Search Report from corresponding EP application 14158456.5, dated Jun. 12, 2014.
English-language translation of Abstract for CN patent application 101064177 A, dated Oct. 31, 2007.
First Office Action and Search Report for corresponding CN patent application 201410094395.6, dated Nov. 2, 2016.
English-language translation of First Office Action and Search Report for corresponding CN patent application 201410094395.6, dated Nov. 2, 2016.
English-language translation of Abstract for CN patent application publication 102508596, dated Jun. 20, 2012.
Second Office Action and Search Report from corresponding CN patent application 201410094395.6, dated Jun. 23, 2017.
English language translation of Second Office Action and Search Report from corresponding CN patent application 201410094395.6, dated Jun. 23, 2017.

* cited by examiner

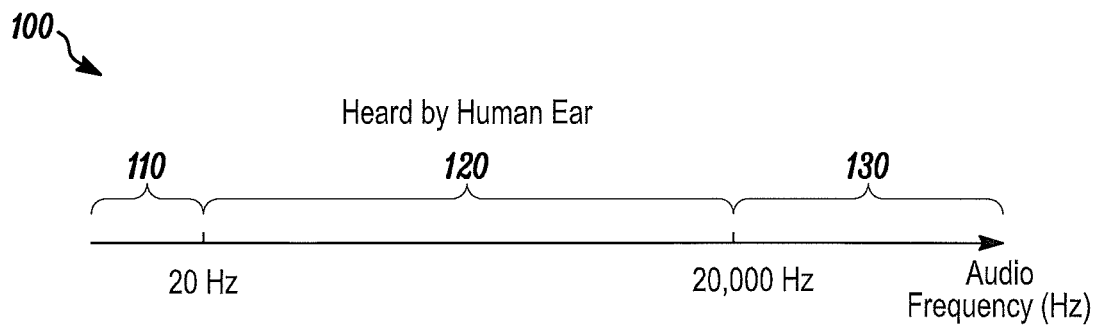
FIG. 1
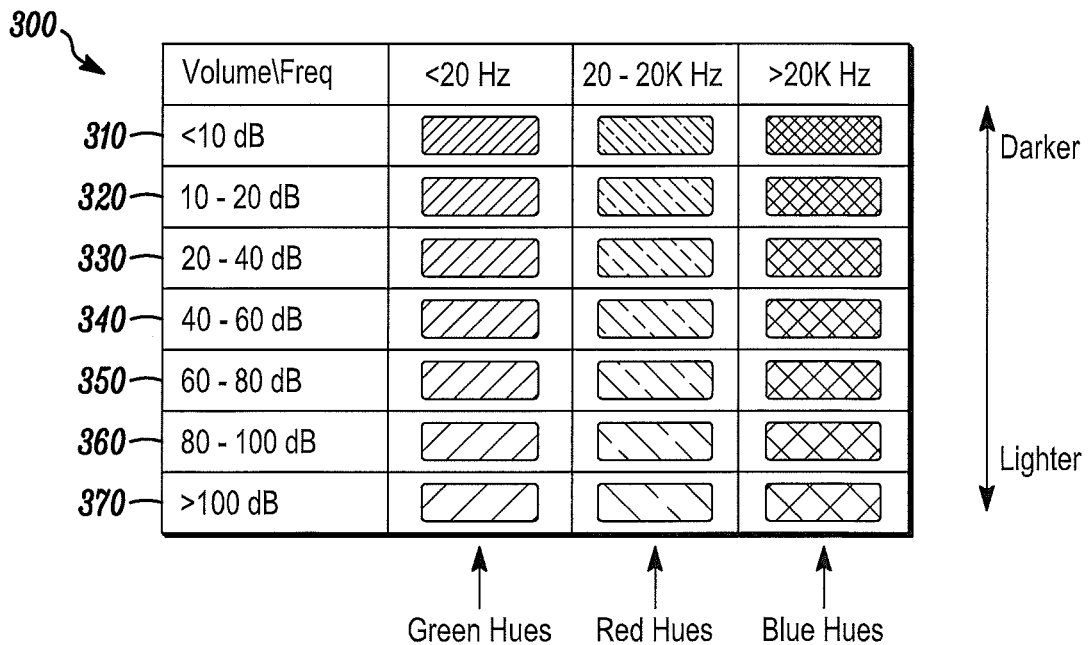
FIG. 2
FIG. 3

SYSTEM AND METHOD OF AUDIO INFORMATION DISPLAY ON VIDEO PLAYBACK TIMELINE

FIELD

The present invention relates generally to video data streams that include an audio component. More particularly, the present invention relates to systems and methods of displaying a visual representation of audio information on a timeline associated with a video data stream.

BACKGROUND

Audio data has and will continue to play a vital role in security systems. For example, many data streams that are recorded in known video surveillance systems include both video and audio components.

Audio analytics are known in the art, and some Internet protocol cameras have integrated systems and methods to perform audio analytics in the camera. However, there are no known systems and methods to vividly unfold audio information associated with a video data stream so that a user can readily and easily identify audio information of interest. For example, there are no known systems and methods for a user to locate an abnormal audio recording in a video data stream and/or to identify a time when abnormal audio occurred. Instead, known systems and methods require a user to listen to the audio to identify and locate audio information of interest.

In view of the above, there is a continuing, ongoing need for systems and methods of displaying a visual representation of audio information on a timeline associated with a video data stream.

BRIEF DESCRIPTION OF THE DRAWINGS

FIG. 1 is a chart displaying audio frequency;
FIG. 2 is a chart for audio frequency visualization in accordance with disclosed embodiments;
FIG. 3 is a chart for audio volume visualization in accordance with disclosed embodiments.

DETAILED DESCRIPTION

Figure 4:
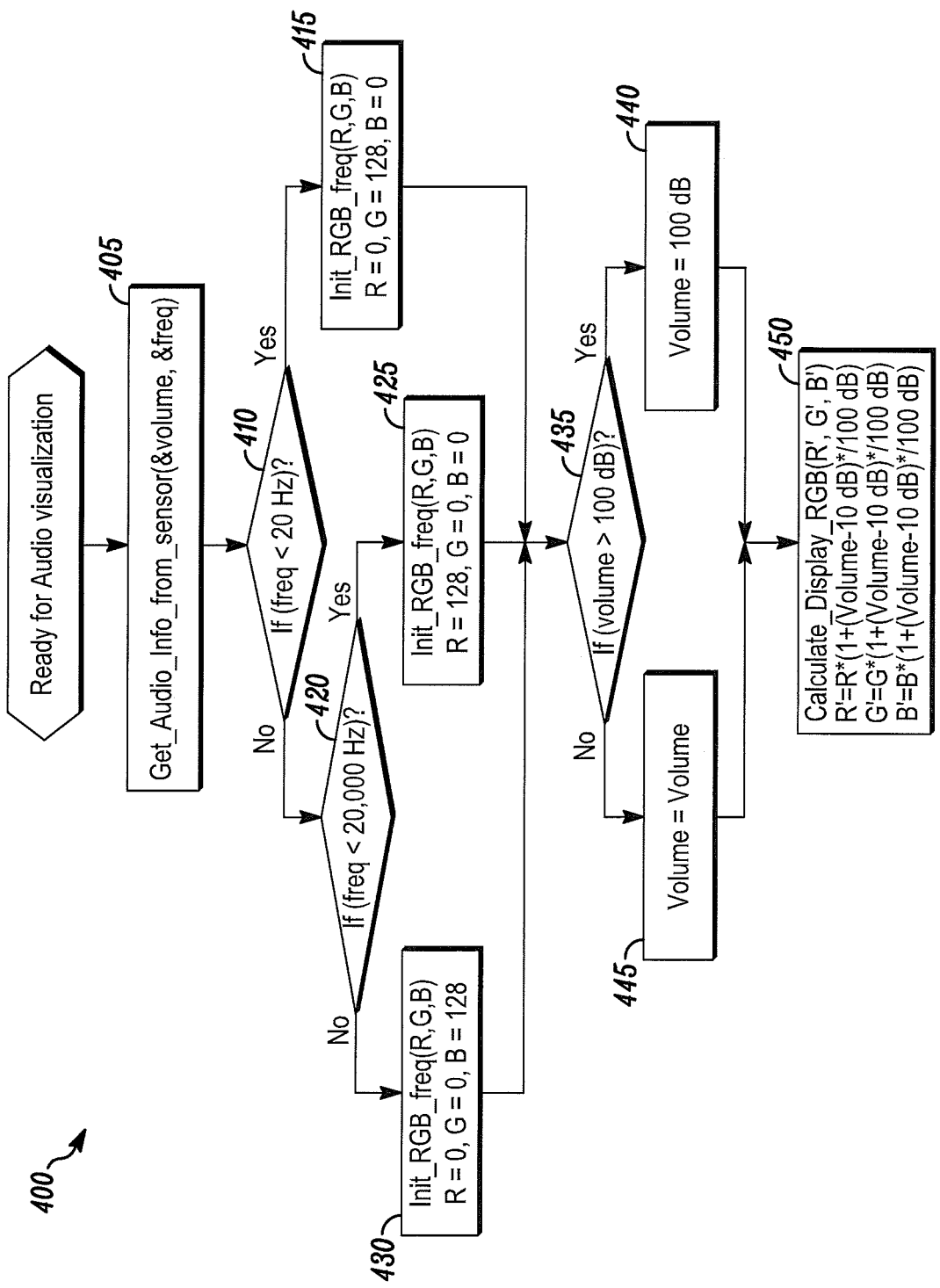
FIG. 4 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of displaying a visual representation of audio information on a timeline associated with a video data stream. For example, systems and methods disclosed herein can provide a user with an overview of audio information associated with a video data stream. Accordingly, systems and methods can allow a user to readily identify and locate any abnormal audio, as well as the type of the abnormal audio, for example, a gunshot, broken glass, human voice, and the like, and the time that the abnormal audio occurred within an associated video data stream.

In accordance with disclosed embodiments, audio information can be classified by audio frequency and/or audio volume. For example, different frequency and volume levels can be mapped as different colors in the color domain and stored and/or embedded in a file of an associated video data stream.

It is known that humans can hear and sense audio at frequencies between approximately 20 Hz and approximately 20,000 Hz, although this range of frequencies can vary when influenced by various environmental factors. FIG. 1 is a chart 100 displaying audio frequency, and as seen in FIG. 1, audio frequencies can be divided into three groups: frequencies below approximately 20 Hz 110, frequencies between approximately 20 Hz and approximately 20,000 Hz 120, and frequencies above approximately 20,000 Hz 130.

In accordance with disclosed embodiments, audio information with different frequency and/or volume can be represented with different colors and shades and can be visually displayed on a timeline associated with a video data stream. For example, FIG. 2 is a chart 200 for audio frequency visualization in accordance with disclosed embodiments, and FIG. 3 is a chart 300 for audio volume visualization in accordance with disclosed embodiments.

As seen in FIG. 2, audio information in a first range of frequencies 210, for example, less than approximately 20 Hz, can be represented with a first color, for example, green. Audio information in a second range of frequencies 220, for example, between approximately 20 Hz and approximately 20,000 Hz, can be represented with a second color, for example, red. Audio information in a third range of frequencies 230, for example, greater than approximately 20,000 Hz, can be represented with a third color, for example, blue.

Similarly, audio information in a first range of volume 310, for example, less than approximately 10 dB, can be represented with a first color shade or darkness. Audio information in a second range of volume 370, for example, greater than approximately 100 dB, can be represented with a second color shade or darkness. Audio information at different ranges between the first and second ranges of volume, for example, a range 320 between approximately 10 dB and approximately 20 dB, a range 330 between approximately 20 dB and approximately 40 dB, a range 340 between approximately 40 dB and approximately 60 dB, a range 350 between approximately 60 dB and approximately 80 dB, and a range 360 between approximately 80 dB and approximately 100 dB, can be represented with a respective color shades or darkness. For example, as seen in FIG. 3, the respective color shade can gradually change from dark to light as the frequency range changes from a low range of volume 310 to a high range of volume 370.

In accordance with disclosed embodiments, audio information, including the respective frequency and/or volume information, can be integrated and/or embedded into an associated video data stream. For example, the respective color and shade or darkness information, mapping information, and/or timeline information can be integrated and/or embedded into the associated video data stream. Accordingly, when the video data stream is displayed on a user interface, the timeline can also be displayed, thus, displaying visual representations of the audio information as well as the time to which that audio information relates.

In some embodiments, systems and methods disclosed herein can retrieve frequency and volume information from an audio process module and/or from a sensor that captured the audio. Then, systems and methods disclosed herein can transfer the frequency and volume information of the audio into a color space, and store and/or embed the frequency and volume information and/or the transferred color information into an associated video data stream. When the video data stream is displayed, the embedded audio information and/or color information can be visually displayed on a timeline associated with the video data stream. That is, an overview of the audio information associated with the video data stream can be displayed, and a user can use the visualization of the audio information to readily identify any abnormal occurrences within the video data stream.

For example, FIG. 4 is a flow diagram of a method 400 of calculating a display color for audio information in accordance with disclosed embodiments. As seen in FIG. 4, when the method 400 is ready to execute audio visualization, the method 400 can retrieve audio information from sensors that captured the audio information as in 405. For example, the retrieved audio information can include frequency information and volume information.

The method 400 can determine whether the retrieved audio information includes a frequency that is less than approximately 20 Hz as in 410. If yes, then the method 400 can map the audio information to a first color, for example, green as in 415. For example, the method 400 can map the audio information in a (R,G,B) color domain as (0,128,0).

However, if the method 400 determines that the retrieved audio information does not include a frequency that is less than approximately 20 Hz as in 410, then the method 400 can determine whether the retrieved audio information includes a frequency that is less than approximately 20,000 Hz as in 420. If yes, then the method 400 can determine that the retrieved audio information includes a frequency that is between approximately 20 Hz and approximately 20,000 Hz. Accordingly, the method 400 can map the retrieved audio information to a second color, for example, red as in 425. For example, the method 400 can map the retrieved audio information in a (R,G,B) color domain as (128,0,0).

However, if the method 400 determines that the retrieved audio information does not include a frequency that is less than approximately 20,000 Hz as in 420, then the method 400 can map the retrieved audio information to a third color, for example, blue as in 430. For example, the method 400 can map the retrieved audio information in a (R,G,B) color domain as (0,0,128).

After the method 400 maps the retrieved audio information to the first, second, or third color, for example, green, red, or blue as in 415, 425, and 430, respectively, the method 400 can determine whether the retrieved audio information includes a volume greater than approximately 100 dB as in 435. If yes, then the method 400 can set a volume parameter to 100 dB as in 440. However, if the method 400 determines that the retrieved audio information does not include a volume greater than approximately 100 dB as in 435, then the method 400 can determine the volume of the retrieved audio information and set the volume parameter to a value associated with the determined volume as in 445.

Finally, the method 400 can calculate a display color for the retrieved audio information as in 450. For example, the method 400 can determine the shade, that is, the darkness and/or lightness value, of the mapped green, red, and blue audio information. In some embodiments, the method 400 can determine the display color as follows:

$$\text{Display Color} = \text{Mapped Color} * (1+(\text{Volume}-10 \text{ dB}))/100 \text{ dB} \quad (1)$$

Accordingly, in some embodiments, the display color for the retrieved audio information can be a function of both the volume of the audio information, and the mapped color, which is a function of the frequency of the audio information.

Figure 5:
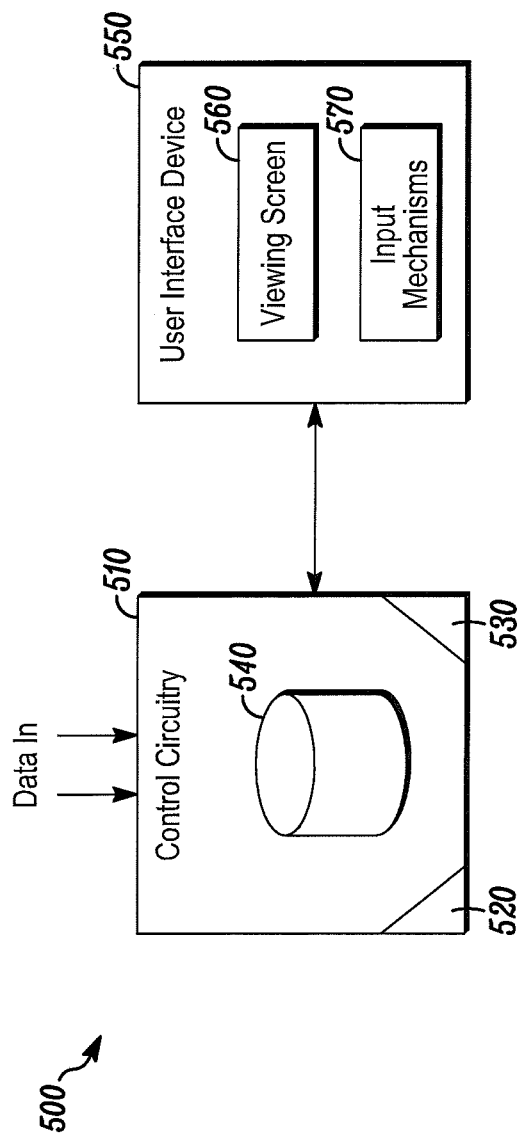
FIG. 5 is a block diagram of a system for executing the method of FIG. 4 and others in accordance with disclosed embodiments.

FIG. 5 is a block diagram of a system 500 for executing the method of FIG. 4 and others in accordance with disclosed embodiments. As seen in FIG. 5, the system 500 can include control circuitry 510, one or more programmable processors 520, and executable control software 530 as would be understood by those of ordinary skill in the art. The executable control software 530 can be stored on a transitory or non-transitory local computer readable medium, including, but not limited to, local computer memory, RAM, optical storage media, magnetic storage media, flash memory, and the like.

An associated user interface device 550 can be in communication with the control circuitry 510, and a viewing screen 560 of the user interface device can display interactive and viewing windows. In some embodiments, the user interface device 550 can include a multi-dimensional graphical user interface. In some embodiments, the user interface device 550 can include one or more input mechanisms 570, for example, a keypad or a mouse, that can receive user input.

As seen in FIG. 5, the control circuitry 510 can receive data, for example, audio information, video information, and/or video data stream files that include audio information. In some embodiments, the control circuitry 540 can include a memory device 540 for storing the received and/or processed data.

The control circuitry 540, including the programmable processor 520 and the executable control software 530, can process the received data to classify, map, and/or provide a visual representation of the audio information. The viewing screen 560 of the user interface device 550 can then display the processed audio information in connection with a timeline displayed on the viewing screen 560. For example, the timeline can be associated with the received audio and video data, and visual representations of the audio data that correspond to respective times periods can be displayed on the timeline.

Figure 6:
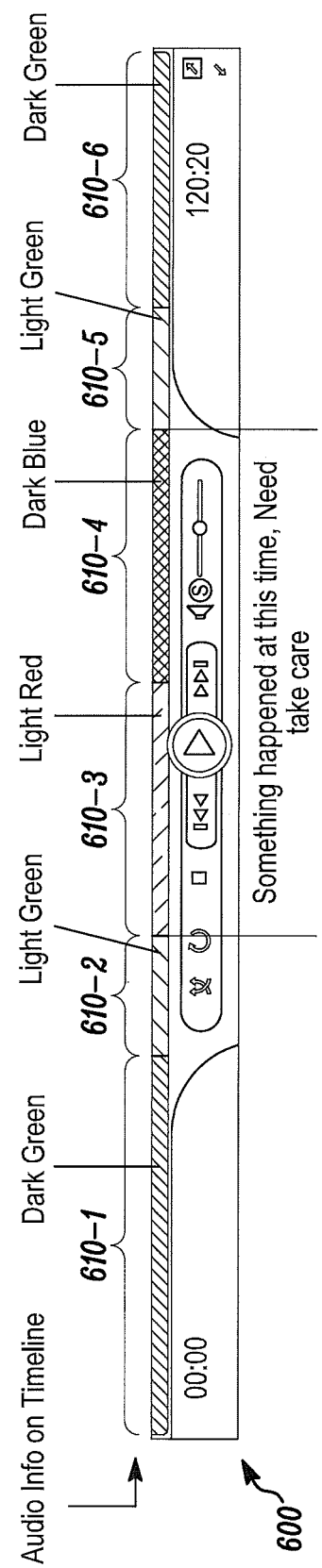
FIG. 6 is a view of a timeline displayed on a graphical user interface in accordance with disclosed embodiments.

FIG. 6 is a view of an exemplary timeline 600 in accordance with disclosed embodiments. As seen in FIG. 6, the timeline 600 can visually display a representation of audio information. In some embodiments, the timeline 600 can include a plurality of different time periods 610, and each one of the plurality 610 can be displayed as a respective color and shade that corresponds audio information for that time period.

For example, in the timeline 600 in FIG. 6, the timeline 600 can include six different time periods 610-1, 610-2, 610-3, 610-4, 610-5, 610-6. During the first period 610-1, the timeline 600 can be displayed as a dark green. Accordingly, a user viewing the timeline 600 can understand that audio during the first time period 610-1 includes a frequency less than approximately 20 Hz and includes a volume that is relatively low. During the second time period 610-2, the timeline 600 can be displayed as a light green. Accordingly, a user viewing the timeline 600 can understand that audio during the second time period 610-2 includes a frequency less than approximately 20 Hz, but includes a volume that is relatively high.

During the third time period 610-3, the timeline 600 can be displayed as a light red. Accordingly, a user viewing the timeline 600 can understand that audio during the third time period 610-3 includes a frequency between approximately 20 Hz and approximately 20,000 Hz and includes a volume that is relatively high. Then, during the fourth time period 610-4, the timeline 600 can be displayed as a dark blue. Accordingly, a user viewing the timeline 600 can understand that audio during the fourth time period 610-4 includes a frequency greater than approximately 20,000 Hz and includes a volume that is relatively low. Given the change in audio from the second time period 610-2 to the third and fourth time periods 610-3, 610-4, a user can readily identify that an event of potential interest occurred during the third and/or fourth time periods 610-3, 610-4. Accordingly, a user can listen to the audio and/or view the video during and substantially immediately preceding and following the third and fourth time periods 610-3, 610-4.

During the fifth time period 610-5, the timeline 600 can be displayed again as a light green. Accordingly, a user viewing the timeline 600 can understand that audio during the fifth time period 610-5 includes a frequency less than approximately 20 Hz and includes a volume that is relatively high. During the sixth time period 610-6, the timeline 600 can be displayed as a dark green. Accordingly, a user viewing the timeline 600 can understand that audio during the sixth time period 610-6 includes a frequency less than approximately 20 Hz, but includes a volume that is relatively low.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method for operating a video surveillance system, comprising:
   receiving audio information associated with a video data stream captured by a camera of a video surveillance system;
   determining a frequency range among a plurality of frequency ranges of the audio information over time;
   determining a volume range among a plurality of volume ranges of the audio information over time;
   determining a visual representation of the audio information over time, wherein the visual representation includes a color corresponding to the determined frequency range of the audio information over time and a shade corresponding to the determined volume range of the audio information over time, both correlated to a timeline of the associated video data stream;
   displaying the timeline associated with the video data stream on a display; and
   displaying the visual representation of the audio information as a plurality of rectangular segments along the timeline so as to provide a compact visual overview of the audio information of the video data stream such that an operator of the video surveillance system can more easily identify occurrences of possible security events in the video data stream that include an abnormal audio component and a time within the video data stream that the possible security events occurred;
   wherein the plurality of rectangular segments each have a same height, a variable width and an interior, wherein an entirety of the interior of each rectangular segment uniformly represents a color and a shade, wherein the color corresponding to the determined frequency range and the shade corresponding to the determined volume range of the corresponding rectangular segment; and
   wherein the variable width of at least some of the plurality of rectangular segments corresponding to a length of time that the audio information remains in the frequency range and the volume range that are associated with the corresponding rectangular segment.

2. The method of claim 1 wherein receiving the audio information includes receiving audio data from an audio sensor.

3. The method of claim 1 further comprising embedding the visual representation of the audio information in a video data stream file.

4. A method for operating a video surveillance system, comprising:
   displaying a timeline associated with a video data stream on a display of the video surveillance system;
   displaying a visual representation of audio information in the video data stream as rectangular segments having a uniform height and variable widths along the timeline, wherein a color of the visual representation of each rectangular segment along the timeline is based on a frequency range among a plurality of frequency ranges of the audio information;
   wherein a shade of the visual representation of each segment of the timeline is based on a volume range among a plurality of volume ranges of the audio information;
   wherein an operator of the video surveillance system can more easily identify occurrences of possible security events in the video data stream that include an abnormal audio component and a time within the video data stream that the possible security events occurred; and
   wherein each rectangular segment has a same height, a variable width and an interior, wherein an the interior of each rectangular segment uniformly represents a color based on the frequency range among the plurality of frequency ranges of the audio information and a shade based on a volume range among a plurality of volume ranges of the audio information of the corresponding rectangular segment.

5. A video surveillance system comprising:
   a transceiver; and
   a programmable processor and executable control software stored on a non-transitory computer readable medium,
   wherein the transceiver receives audio information associated with a video data stream captured by a camera of the video surveillance system,
   wherein the programmable processor and the executable control software determine a frequency of the audio information over time and a volume of the audio information over time,
   wherein the programmable processor and the executable control software determine a visual representation of the audio information over time, wherein the visual representation includes a color corresponding to the frequency range of the audio information over time and a shade corresponding to the volume range of the audio information over time, both correlated to a timeline of the associated video data stream;

wherein the programmable processor and the executable control software display the timeline associated with the video data stream on a display;

wherein the programmable processor and the executable control software display the visual representation of the audio information as a plurality of rectangular segments having a uniform height and a variable width along the timeline with each segment of the plurality of segments having a same color and/or shade along its width so as to provide a compact visual overview of the audio information of the video data stream such that an operator of the video surveillance system can more easily identify occurrences of possible security events in the video data stream that include an abnormal audio component and a time within the video data stream that the possible security events occurred; and wherein the plurality of rectangular segments each have a same height, a variable width and an interior, wherein an entirety of the interior of each rectangular segment uniformly represents a color and a shade, wherein the color corresponding to the determined frequency range and the shade corresponding to the determined volume range of the corresponding rectangular segment.

6. The system of claim 5 wherein the programmable processor and the executable control software embed the visual representation in a video data stream file.

7. The system of claim 5 further comprising:

a user interface device, wherein the programmable processor and the executable control software cause the timeline to be displayed on the user interface device, and wherein the programmable processor and the executable control software cause the visual representation to be displayed on segments of the timeline.

* * * * *